United States Patent [19]
Butters

[11] 3,865,358
[45] Feb. 11, 1975

[54] DENT DEFLECTOR FOR MOBILE HOMES
[76] Inventor: Jeff A. Butters, 10355 Armenta St., Sun Valley, Calif. 91352
[22] Filed: Nov. 29, 1972
[21] Appl. No.: 310,258

[52] U.S. Cl. ........................ 267/140, 293/1, 293/60
[51] Int. Cl. ................................................ F16f 1/36
[58] Field of Search ........... 267/140, 141; 293/1, 60

[56] References Cited
UNITED STATES PATENTS

| | | | |
|---|---|---|---|
| 3,359,030 | 12/1967 | Newman | 267/140 |
| 3,473,836 | 10/1969 | Halter | 267/140 |
| 3,574,379 | 4/1971 | Jordan | 267/140 |

Primary Examiner—James B. Marbert
Attorney, Agent, or Firm—Christie, Parker & Hale

[57] ABSTRACT

A dent deflector for mobile homes and the like includes an elongated impact-absorbing guard rail, and a series of longitudinally spaced apart generally U-shaped mounting members each releasably interlocked with an elongated connector formed on the base of the guard rail. The mounting members are attached to the mobile home to hold the guard rail in a fixed position spaced outwardly from an exterior wall or skirt of the mobile home. The interlocking fit between the mounting members and the guard rail connector is continuous for the length of the guard rail so the mounting members can be fastened to any preselected locations on the wall or skirt prior to attachment of the guard rail to the mounting members.

6 Claims, 4 Drawing Figures

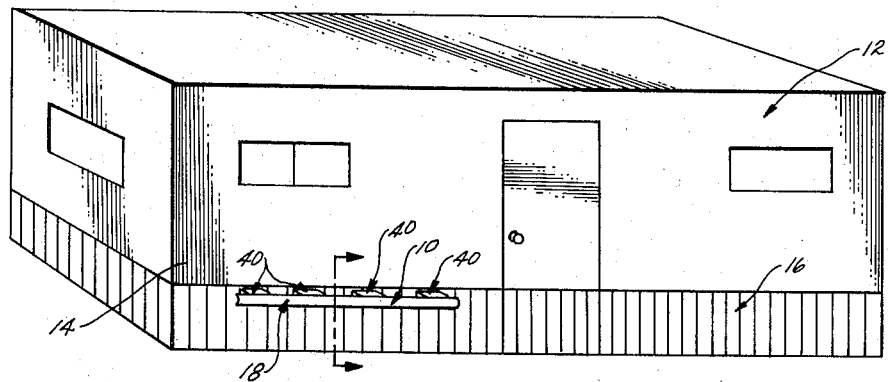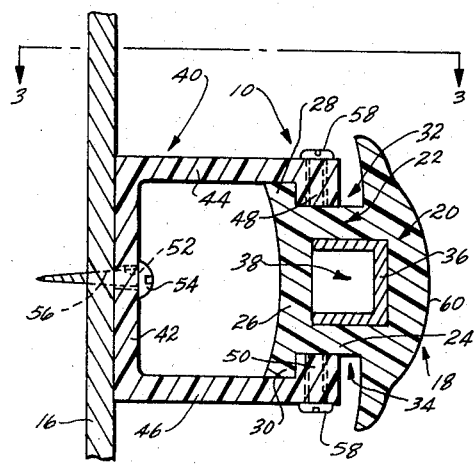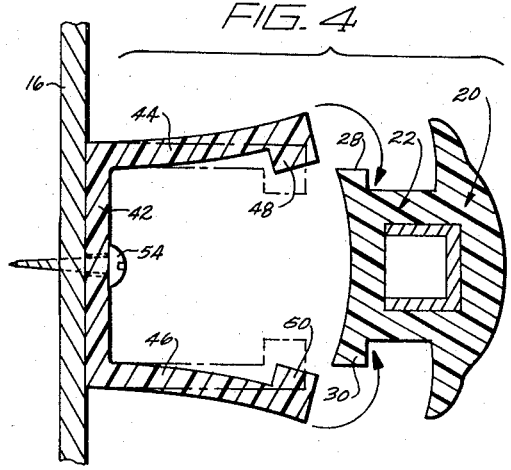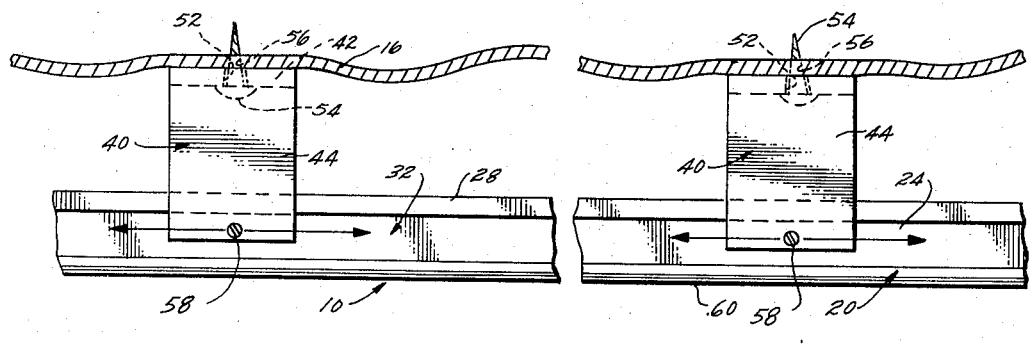

DENT DEFLECTOR FOR MOBILE HOMES

BACKGROUND OF THE INVENTION

This invention relates to bumpers, deflectors, and similar impact-absorbing devices for protecting objects from damage. Although the present invention can be used to protect a variety of objects from impact damage, it is especially useful in protecting the exterior side wall panels or skirting of mobile homes from damage caused by denting, chipping, cracking and the like.

Most mobile homes today are mounted on large concrete foundation blocks to elevate the mobile home above the ground. Generally, the space between the ground and the bottom of the mobile home is covered by a skirt which usually is made of corrugated metal sheeting. Many of these mobile homes have a carport or parking area adjacent the exterior wall panel or skirt. Thus, people opening the door of an automobile parked next to the mobile home often dent or otherwise damage the exterior wall panel or the skirting of the mobile home.

SUMMARY OF THE INVENTION

This invention provides a dent deflector which can be easily mounted to the exterior of a mobile home wall panel or skirting to protect these parts from impact damage caused by the opening of automobile doors.

Briefly, the dent deflector includes an elongated guard rail having a frontal impact-absorbing portion and a base portion which includes an elongated connector member projecting laterally in a direction remote from the impact-absorbing portion of the guard rail. Several extension and mounting members are releasably engaged with the connecting member in an interlocking fit which is continuous for the length of the connecting member. The extension and mounting members are adapted for attachment to the mobile home so that they can hold the impact-absorbing portion of the guard rail in a position spaced outwardly from the side of the mobile home so that automobile doors opened next to the mobile home will come into contact with the impact-absorbing guard rail, thereby avoiding impact damage to the side of the mobile home or its skirting.

The dent deflector of this invention is especially suitable for mobile homes, because it is adapted to mount the guard rail to any location on the mobile home exterior wall panel, or its skirting, even if the skirting has an irregular surface, such as that of corrugated sheeting. Since the extension and the mounting members are releasably attached to the guard rail in a continuous interlocking fit, the extension and mounting members can be initially attached to suitable mounting points on the mobile home, or its skirting, independently of the guard rail. The guard rail is then attached to the extension and mounting members. Once the guard rail is in position, the fasteners which hold the extension and mounting members on the mobile home are covered by the guard rail. Thus, the dent deflector has no exposed metal structural members, or other irregular projections, which could damage any object coming in contact with the dent deflector.

BRIEF DESCRIPTION OF THE DRAWING

These and other aspects of the invention will be more fully understood by referring to the following detailed description and the accompanying drawing in which:

FIG. 1 is a perspective view showing the dent deflector of this invention attached to a skirt at the bottom of a mobile home;

FIG. 2 is a fragmentary sectional elevation view taken on line 2—2 of FIG. 1;

FIG. 3 is a fragmentary plan elevation view, partly in section, taken on line 3—3 of FIG. 2; and FIG. 4 is a fragmentary sectional elevation view illustrating the preferred means for mounting the dent deflector to the mobile home.

DETAILED DESCRIPTION OF THE PREFERRED EMBODIMENT

FIG. 1 shows an elongated dent deflector 10 as it is used to protect the siding of a mobile home 12 from impact damage. In this instance the long dimension of the dent deflector is disposed in a substantially horizontal position, and the dent deflector is attached to a location on the mobile home where it will protect the mobile home from damage, especially that caused by persons opening the doors of automobiles parked next to the mobile home.

The mobile home includes an exterior front wall panel 14 and a skirt 16 covering the space between the ground and the bottom of the mobile home. It is common for skirt 16 to be made of corrugated metal sheeting, usually corrugated aluminum sheeting. The drawing shows the dent deflector attached to a corrugated skirt around the bottom of the mobile home, although the dent deflector also can be readily attached to exterior front wall panel 14. The particular place of attachment is that which will most effectively prevent automobile doors from colliding with the mobile home.

As will become clear from the following detailed description, dent deflector 10 is adapted to be quickly and easily mounted to all kinds of surfaces, whether they be planar, as is the conventional mobile home exterior wall panel, or whether they have surface irregularities, such as that of the corrugated skirts.

The detailed construction of the dent deflector will be understood best by referring to FIGS. 2 and 3. The dent deflector includes an elongated guard rail member 18 which, when viewed in cross-section, has a generally D-shaped impact-absorbing front portion 20 formed integrally with a generally T-shaped base portion 22 projecting laterally away from frontal portion 20.

The T-shaped base portion includes an intermediate portion 24 of reduced width projecting rearwardly from the D-shaped frontal portion, and a rear flange or connecting member 26 integral with intermediate portion 24. Flange 26 thus provides an elongated upwardly projecting top ridge or shoulder 28 extending lengthwise along the rear of the guard rail, and a downwardly projecting bottom ridge or shoulder 30 disposed below and parallel to top ridge 28 and also extending lengthwise along the rear of the guard rail.

Intermediate portion 24 cooperates with the top and bottom ridges and with the frontal portion 20 to define an elongated top groove 32 extending lengthwise along an intermediate portion of the guard rail, and an elongated bottom groove 34 located below and parallel to groove 32 and also extending lengthwise along an intermediate portion of the guard rail.

Preferably, guard rail 18 is made from an extrusion of polyvinyl chloride containing a plasticizer which gives the guard rail a rubbery texture. This makes the guard rail flexible and slightly deformable, so it will readily absorb shock and also avoid damaging any other object which impacts it with a reasonable amount of force. An elongated U-shaped reinforcing channel 36 extending substantially the entire length of the guard rail is disposed in a square shaped elongated passage 38 formed centrally in intermediate portion 24 of the guard rail extrusion. Channel 36 preferably is made of metal, such as aluminum, to provide additional rigidity for the guard rail.

A plurality of spaced apart generally U-shaped extension and mounting members 40 attach the guard rail to exterior side wall panel 14 or skirt 16 of the mobile home. Each extension and mounting member 40 includes a flat base 42 with a transverse top leg 44 and bottom leg 46 extending away from the opposite ends of the base. An elongated top ridge 48 projects downwardly from the free end of top leg 44, and an elongated bottom ridge 50 projects upwardly from the free end of bottom leg 46.

Base 42 of each extension and mounting member 40 includes a central bore 52 for receiving a respective fastener, such as a screw 54, for use in attaching the mounting member to the mobile home. In attaching the mounting member, the user preferably forms a hole 56 in the exterior wall panel or skirt. In the case where the dent deflector is to be connected to the skirt, each hole 56 preferably is formed at a depressed portion, or valley, of the corrugated sheet. Screw 54 preferably is a wood screw for making a strong connection to a plywood panel (not shown) which ordinarily is used as the backing for the skirting 16. When each screw 54 is tightened into the wood backing panel, it pulls the bottom surface of the corrugation substantially flush with the rear edge of base 42, as illustrated best in FIG. 3. Thus, once the several extension and mounting members 40 are attached to desired locations on skirt 16 or the wall panel 14, guard rail 18 then can be attached in a releasable interlocking fit with the outwardly projecting legs of mounting members 40 so as to hold the guard rail in a fixed position along the side of the mobile home.

As shown best in FIG. 2, the interlocking fit is provided by top and bottom legs 44 and 46 being shaped so that they rest against the top and bottom ridges of top and bottom shoulders 28 and 30, respectively, as top and bottom ridges 46 and 48 make an interlocking fit with the top and bottom grooves 32 and 34, respectively. Preferably, each extension and mounting member 40 is made of plastic material, such as a relatively stiff polyvinyl chloride, which provides sufficient rigidity to hold the guard rail member in a fixed position. However, as shown best in FIG. 4, legs 44 and 46 have a slight degree of resiliency so that they may be bent outwardly to allow the T-shaped connecting member 22 of the guard rail to be inserted into the extension and mounting members in an interlocking snap fit.

As shown best in FIG. 2, the top and bottom grooves 32 and 34 are continuous for the entire length of the guard rail. Thus, guard rail 18 can slide longitudinally relative to extension and mounting members 40, as represented by the arrows in FIG. 3. However, and more importantly, this releasable and slidable connection between the mounting members and guard rail connecting member 22 makes it possible for a given mounting member 40 to be attached to any location on connecting member 22. This makes the present dent deflector especially suitable for use in attaching to mobile homes with corrugated siding. That is, each extension and mounting member 40 initially can be secured to a desired location on the siding, preferably in a depressed area of the corrugations where they make the strongest type of attachment (the sides of the corrugations then provide lateral support for each mounting member). Thereafter, the continuous connecting member 22 of the guard rail can simply be interlocked with each mounting member 40 independently of where all the mounting members are located. Once the guard rail is in place, a pair of fasteners 58 extending through the end portions of legs 44 and 46 are tightened against the upper and lower surfaces, respectively, of grooves 32 and 34 to hold the guard rail in a fixed position relative to mounting members 40.

An additional advantage of this type of connection is that fasteners 54 are hidden from view once the guard rail is attached. This provides an advantage in the appearance of the dent deflector, as well as shielding the outwardly projecting metal fasteners from coming into contact with any object which they might otherwise damage.

Moreover, guard rail 18 has no exposed projecting metal structural parts which could otherwise damage objects coming in contact with it, and the curvilinear shape of the frontal impact-absorbing surface 60 of frontal portion 20 projects above and below mounting members 40 to provide protection against objects impacting the guard rail from a wide envelope of directions.

What is claimed is:

1. A device for protecting mobile homes and the like from impact damage comprising:

an elongated guard rail member made from a deformable material for providing an impact-absorbing, elongated front section thereof and having an elongated reinforcing member to provide rigidity for the length of the deformable guard rail member, an elongated connecting member formed integrally with a base portion of the guard rail member and projecting rearwardly away from the impact-absorbing front portion thereof, the connecting member being continuous for a substantial portion of the length of the guard rail member, a plurality of generally U-shaped mounting members each including a base portion with a pair of spaced apart legs extending forwardly from the base portion, the legs of each mounting member including separate locking means for engaging the continuous connecting member of the guard rail in a releasable interlocking fit for attaching the mounting members to the connecting member in a spaced apart relation along the length of the guard rail, with each mounting member being releasably attached at locations on the connecting member independently of the locations of the other mounting members, the legs of each mounting member being elongated to, in normal use, hold the guard rail member spaced a substantial distance forward from the base portions of the several mounting members, fastening means cooperating with the base portion of each mounting member for securing the guard rail member to the mobile home, and separate fastener members extending through the legs of each mounting member to rigidly secure the legs to the connecting member.

2. Apparatus according to claim 1 in which the guard rail member has an impact-absorbing surface which is generally outwardly bowed relative to the base portion, and in which the impact-absorbing portion projects above and below each mounting member, as defined when the guard rail member is disposed in a horizontal plane, so that the impact-absorbing surface will be in a position to absorb shock coming from a relatively large envelope of directions when attached to the mobile home.

3. A dent deflector for attachment to the side of a mobile home to protect the mobile home from impact damage, the dent deflector comprising:

an elongated guard rail having a front section, and a rear section formed integrally with the front section, the front section of the guard rail being made from a deformable material for providing an elongated, impact-absorbing front edge along the length of the guard rail, the rear section of the guard rail being an elongated connecting member projecting from the front section and being continuous along the length of the guard rail, a plurality of separate generally U-shaped mounting members each being freely movable relative to the other mounting members for attachment to the guard rail independently of the other mounting members, each mounting member including a base portion and a pair of spaced apart legs extending from the base portion for releasable attachment to the connecting member of the guard rail, separate fastening means associated with the base portion of each mounting member for attaching the base portions of the mounting members to the mobile home, the legs of each mounting member including separate locking means for engaging the continuous connecting member of the guard rail in a releasable interlocking fit to attach the mounting members to the connecting member in a spaced apart relation along the length of the guard rail, with each mounting member being releasably attached at locations on the connecting member independently of the locations of the other mounting members, the legs of each mounting member being generally resilient so the guard rail can be engaged with the mounting members, after the latter are fastened to the mobile home, by spreading apart the legs and engaging the locking members thereof with the connecting member of the guard rail, the legs of each mounting member being elongated to hold the guard rail spaced a substantial distance from the base portions of the mounting members.

4. Apparatus according to claim 3 including separate fastener members extending through the legs of each mounting member to rigidly secure the legs to the connecting member.

5. Apparatus according to claim 3 in which the impact-absorbing front edge of the guard rail is generally outwardly bowed relative to the rear section thereof, and in which the impact-absorbing front edge projects above and below each mounting member, as defined when the guard rail is disposed in a horizontal plane, so that the impact-absorbing front edge will absorb shock coming from a relatively large envelope of direction.

6. Apparatus according to claim 1 in which each leg is resilient so that the guard rail member can be releasably engaged with the mounting members, after the latter are fastened to the mobile home, by engaging the connecting member with the legs of each mounting member in a snap fit.

* * * * *